United States Patent [19]
Krumme

[11] Patent Number: 4,695,713
[45] Date of Patent: Sep. 22, 1987

[54] AUTOREGULATING, ELECTRICALLY SHIELDED HEATER

[75] Inventor: John F. Krumme, Woodside, Calif.

[73] Assignee: Metcal, Inc., Menlo Park, Calif.

[21] Appl. No.: 543,443

[22] Filed: Oct. 19, 1983

Related U.S. Application Data

[63] Continuation-in-part of Ser. No. 430,317, Sep. 30, 1982, abandoned.

[51] Int. Cl.$^4$ ............................................. H05B 3/10
[52] U.S. Cl. ................................ 219/553; 219/10.79; 219/233
[58] Field of Search .............. 219/10.41, 10.43, 10.49, 219/10.51, 10.71, 10.75, 10.79, 229, 233, 241, 301, 553; 128/1.3, 303.1, 303.13, 303.14; 30/40; 174/40 R, 106 R, 126 CP

[56] References Cited

U.S. PATENT DOCUMENTS

| | | | |
|---|---|---|---|
| 1,975,436 | 10/1934 | Sorrel et al. | 219/10.41 |
| 2,181,274 | 11/1939 | Jackson et al. | 219/10.79 |
| 3,218,384 | 11/1965 | Shaw | 174/40 R |
| 3,296,364 | 1/1967 | Mason | 174/106 |
| 3,515,837 | 6/1970 | Ando | 219/10.49 |
| 3,584,190 | 6/1971 | Marcoux | 219/233 |
| 4,079,192 | 3/1978 | Josse | 174/126 CP |
| 4,091,813 | 5/1978 | Shaw et al. | 128/303.14 |
| 4,110,599 | 8/1978 | Offermann | 219/301 |
| 4,185,632 | 1/1980 | Shaw | 128/303.1 |
| 4,207,896 | 6/1980 | Shaw | 128/303.1 |
| 4,256,945 | 3/1981 | Carter et al. | 219/10.75 |
| 4,364,390 | 12/1982 | Shaw | 128/303.1 |
| 4,366,356 | 12/1982 | Ando | 219/301 |

FOREIGN PATENT DOCUMENTS

| | | |
|---|---|---|
| 41-1743 | 2/1966 | Japan . |
| 41-2676 | 2/1966 | Japan . |
| 41-2677 | 4/1966 | Japan . |
| 41-7257 | 4/1966 | Japan . |

*Primary Examiner*—C. L. Albritton
*Attorney, Agent, or Firm*—Hall, Myers & Rose

[57] ABSTRACT

An autoregulating, electrically shielded heater employs a laminated structure having two magnetic alloy permeable materials of widely differing Curie point temperatures and preferably of differing resistivities. A constant current supply is connected across the laminate such that current flows in the laminae along parallel paths. Due to skin effect, the current is confined to a thin region of a first lamina which is located between the other lamina and the electrical return path. This first lamina has the lower Curie temperature and preferably the higher resistivity of the two laminae to produce heating proportional to $I^2R_1$. When the Curie temperature of the first lamina is approached, the current spreads into the other lamina which may have a lower resistivity and higher Curie temperature and heating is obtained by $I^2R_2$ where $I^2$ is a constant due to the constant current source and preferably $R_2 < R_1$. Thus, power is reduced and temperature is maintained at or about the Curie temperature of the first layer. The high permeability of the second lamina prohibits the current from penetrating deeply into the second laminae whereby a low frequency power supply may be used without radiation of the electro-magnetic field.

16 Claims, 7 Drawing Figures

AUTOREGULATING, ELECTRICALLY SHIELDED HEATER

RELATED APPLICATIONS

This application is a continuation-in-part application of patent application Ser. No. 430,317, filed Sep. 30, 1982, abondoned, which application is related to patent application Ser. No. 445,862 filed Dec. 1, 1982.

BACKGROUND OF THE INVENTION

The present invention relates to autoregulating electric heaters and more particularly, to electro-magnetic autoregulating electric heaters that are operable with low frequency energy sources but which do not radiate harmful electro-magnetic fields.

In the U.S. Pat. No. 4,256,945 of Carter and Krumme, there is described an autoregulating electric heater having a laminated structure; one lamina of which has high magnetic permeability and high resistance and another lamina of which is non-magnetic and has a low resistance (such as copper) in electrical contact, and therefore, thermal contact with the first lamina. This structure is adapted to be connected across a constant current, a.c. source such that the layers are in a sense in parallel across the source.

Due to skin effect, the current is initially confined to the high magnetic permeability, high resistance layer so that P - $KR_1$ where P is power, K is $I^2$ which is constant, and R is the effective resistance of the permeable material. The dissipation of power heats the layer until it approaches its Curie temperature. The permeability of the lamina decreases towards the level of the second layer, copper for instance, at about its Curie temperature. The current is no longer confined to the high resistivity first lamina by the magnetic properties of the first lamina, and spreads into the copper layer; the effective resistance of the structure drops materially. the power consumed, P=$KR_2$ where $R_2 << R_1$, is greatly reduced, and the heating effect is reduced to a level that maintains the device at or near Curie temperature. The device thus thermally autoregulates over a narrow temperature range about the Curie temperature.

The current source employed in the aforesaid patent is typically a high frequency source, for instance, 8 to 20 MHz to insure that the current is confined to the thin, high resistance, magnetic layer until the Curie temperature of the magnetic material is attained. Specifically, the maximum regulation is achieved when the thickness of the magnetic layer is of the order of one skin depth at the frequency of operation. Under these circumstances, the maximum change in effective resistance of the structure is achieved at or about the Curie temperature. This fact can be demonstrated by references to the equation for skin depth in a monolithic, i.e., non-laminar magnetic structure:

$$S.D. = 5030 \sqrt{\frac{\rho}{\mu f}} \text{ cm}$$

where $\rho$ is the resistivity of the the material in ohm-cms, $\mu$ is magnetic permeability and $f$ is frequency of the current. The field falls off in accordance with $e^{-x}$ where X=thickness/skin depth. Accordingly, in a monolithic structure, by calculation, 63.2% of the current is confined to one skin depth in the high mu material. In the region of the Curie temperature, where $\mu$ 1, the current spreads into a region $$S.D. = 5030 \sqrt{\frac{\rho}{f\mu}} \text{ cm.}$$

If mu was originally equal to 400, the skin depth in the region at the Curie temperature increases by the square root of 400; i.e., the skin depth in the monolithic structure is now 20 times greater than with $\mu$=400.

The same type of reasoning concerning the skin effect may be applied to the two layer laminar structure in the aforesaid patent. Below the Curie temperature, the majority of the current flows in the magnetic layer when the thickness of this layer is nominally one skin depth of the material below the Curie temperature. In the region of the Curie temperature, the majority of the current now flows in the copper and the resistance drops dramatically. If the thickness of this high mu material were greater than two skin depths, for instance, with $\mu$=400, the percentage change of current flowing in the high conductivity copper would be less and the resistivity change would not be as dramatic. Similarly, if the thickness of the high mu material were materially less than one skin depth, the percentage of current flowing in the high resistivity material at a temperature less than the Curie temperature would be less so that the change of resistance at the Curie temperature would again not be as dramatic. The region of 1.0 to perhaps 1.8 skin depths of high mu material is preferred.

An exact relationship for the two layer case is quite complex. The basic mathematical formulas for surface impedance from which expressions can be obtained for the ratio of the maximum resistance, $R_{max}$, below the Curie temperature, to the minimum resistance, $R_{min}$, above the Curie temperature, are given in Section 5.19, pp. 298-303 of the standard reference, "Fields and Waves in Communications Electronics," 3rd Edition, by S. Ramo, J. R. Whinnery, and T. VanDuzer, published by John Wiley and Sons, New York, 1965. Although the theory described in the above reference is precise only for the case of flat layers, it is still accurate enough for all practical applications in which the skin depth is substantially less than the radius of curvature.

The above facts are clearly demonstrated by the curves A and B of the graphs of FIG. 1 hereof which are based on the two-layer theory in the above reference. The curves are continuous with the parts lying to the left and right of the vertical dashed line being read against the left and right scales, respectively. These curves are plots of autoregulation power ratio as a function of frequency of the current applied to the patented devices. The maximum autoregulation power ratio is achieved at 0.6 MHz for a material having a mu of 600 $\rho_1$=75×10$^{-6}$ and a thickness of 1.5×10$^{-3}$ inch as illustrated in Curve B. In this case, one skin depth is 0.9×10$_{-3}$ inch with a peak ratio of 162 occurring at frequency of 600 KHz. As indicated above, the thickness of the high mu layer is 1.5×10$^{-3}$ inch. Thus, the theoretical optimum thickness is 1.67 times one skin depth thickness below the Curie temperature.

The curve A is for a body having a first lamina of a thickness of 0.5×10$^{-3}$ inch. It is noted that the peak ratio of 160 is attained at 6 MHz, at which frequency the skin depth in the magnetic material is 0.29×10$^{-3}$ inches.

Difficulty may arise in such devices when the Curie temperature is achieved due to spread of the current into adjacent regions outside of the device, particularly if the device is located close to sensitive electrical components.

In copending patent application Ser. No. 243,777, filed Mar. 16, 1981, a continuation-in-part application of the application from which the aforesaid patent matured, there is described a mechanism for preventing the high frequency field generated in the heated device from radiating into the regions adjacent the device. This effect is accomplished by insuring that the copper or other material of high conductivity is sufficiently thick, several skin depths at the frequency of the source, to prevent such radiation and electrical field activity. This feature is important in many applications of the device such as a soldering iron where electromagnetic fields may induce relatively large currents in sensitive circuit components which may destroy such components.

As indicated above, the magnetic field in a simple, single layer, i.e., monolithic structure, falls off as $e^{-x}$ so that at three skin depths, the field is 4.9% of maximum, at five skin depths, it is 0.6%, and at ten skin depths, the field is 0.004% of maximum. For many uses, thickness of three skin depths are satisfactory although ten or more may be required with some highly sensitive devices in the vicinity of large heating currents.

The devices of the patent and application are operative for their intended purposes when connected to a suitable supply, but a drawback is the cost of the high frequency power supply. Where only a very low field may be permitted to radiate from the device, the frequency of the source is preferably maintained quite high, for instance, in the megahertz region, to be able to employ copper or other non-magnetic material having reasonable thicknesses.

SUMMARY OF THE INVENTION

In accordance with the present invention, a relatively low frequency constant current source may be employed as the result of fabricating the normally low resistivity layer from a high permeability, high Curie temperatue material. Thus, the device comprises a high permeability, high resistivity layer adjacent the current return path and a high permeability, preferably low resistivity material remote from the return path and having a higher Curie temperature than the first mentioned layer.

As used herein, the term "high magnetic permeability" refers to materials having permeabilities greater than paramagnetic materials, i.e., ferromagnetic materials, although initial permeabilities of 100 or more are preferred for most applications.

The theory of operation underlying the present invention is that by using a high permeability, high Curie temperature material as the low resistivity layer, the skin depth of the current in this second layer is such as to confine the current to a quite thin layer even at low frequencies thereby essentially insulating the outer surfaces electrically and magnetically but not thermally with a low resistivity layer of manageable thickness. The second layer is preferably formed of a low resistivity material, but this is not essential.

An example of a device employing two high mu laminae utilizes a layer of Alloy 42 having a resistivity of about 70–80 micro-ohm-cm, a permeability of about 400, and a Curie temperature of approximately 300° C. A second layer is formed of carbon steel having a resistivity of about 10 micro-ohm-cm, a permeability of 1000, and a Curie temperature of about 760° C. The skin depths, using a 60 Hz supply are 0.1" for Alloy 42 and 0.025" for carbon steel. An example of a practical 60 Hz heater based on the present invention, may employ a coaxial heater consisting of a 0.25 inch diameter cylindrical or tubular copper conductor (the "return" conductor), a thin layer (perhaps 1002 in thickness) of insulation, followed by the temperature sensitive magnetic alloy having a permeability of 400 and a thickness of 0.1 inch, and finally, an outer jacket of steel having a permeability of 1000 and a thickness of 0.1 inch. The overall heater diameter would be 0.65 inch. If the heater is used in a situation requiring 5 watts per foot of heater length, for, for instance, protection of a liquid against freezing, the total length of the heater is 1000 feet, the resistance of the heater will be 1.96 ohms. The current will be 50 amperes, and the voltage at the generator end will be 140 volts at temperatures somewhat below the Curie temperature of the temperature sensitive magnetic alloy on the inside of the outer pipe. If there were substantial changes in the electrical resistance due to variations of the thermal load, the required voltage must vary in order to maintain constant current; either of these latter supplies provide current at costs considerably less than a constant current supply at 8–20 MHz.

The power regulation ratio (AR) in such a device is not as high as with the device of the patent, with a resistivity difference of about 10;1, but this difference may be readily reduced by using materials of higher and lower resistivities for the low Curie temperature and high Curie temperature materials, respectively. The low Curie temperature, high resistivity materials may be sintered or formed of a compressed powder to provide quite high resistance, and thus large power differentials. Also, a high mu, relatively low resistivity material such as iron or low carbon steel may be employed to further increase the power regulation ratio.

DESCRIPTION OF THE PREFERRED EMBODIMENTS

Figure 1A:
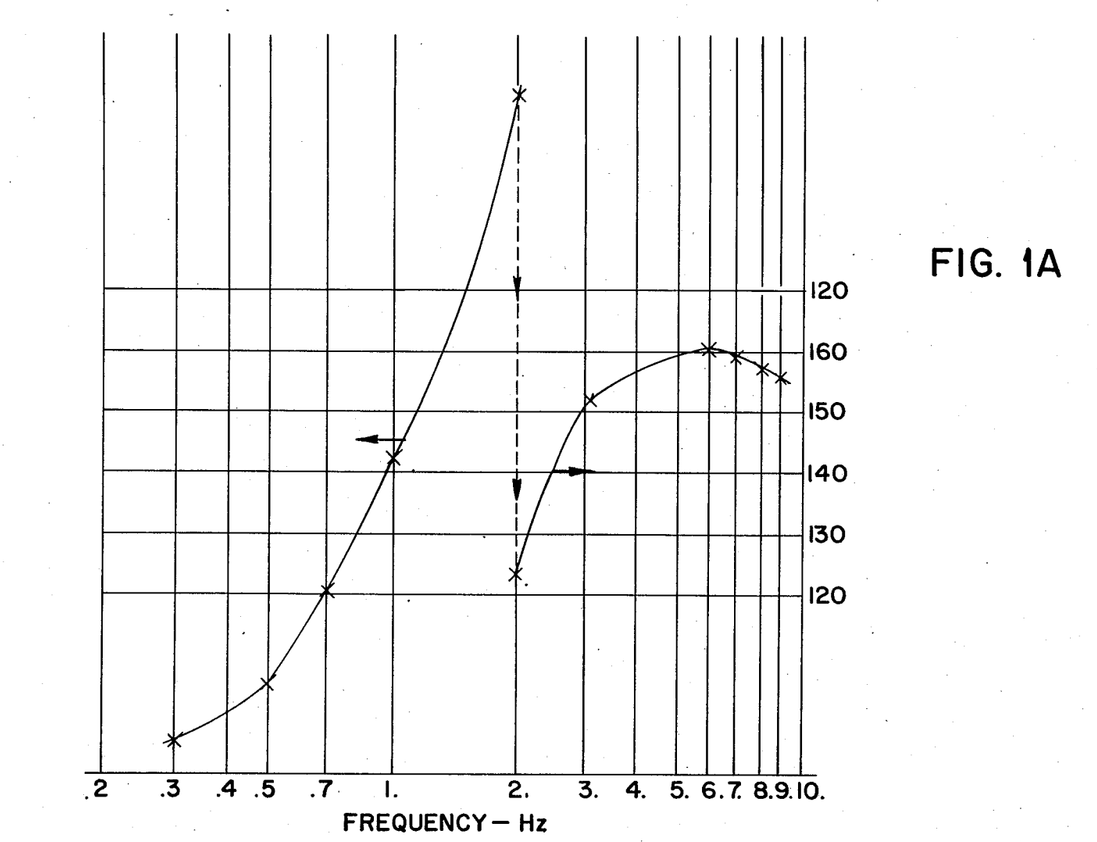
FIG. 1 is a series of graphs illustrating the autoregulating power ratio versus frequency characteristics of the apparatus of the aforesaid patent.
Figure 1B:
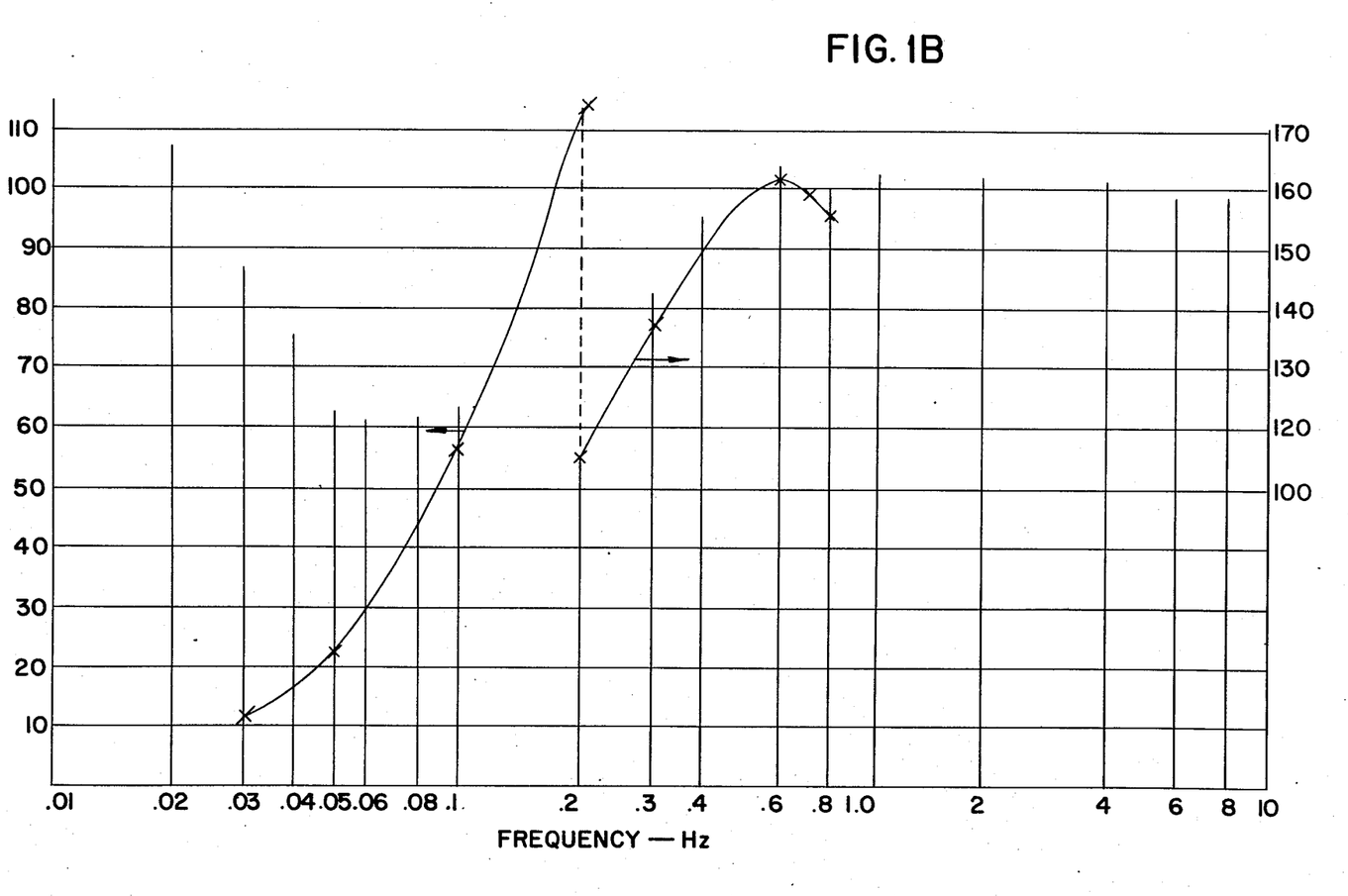
Figure 1C:
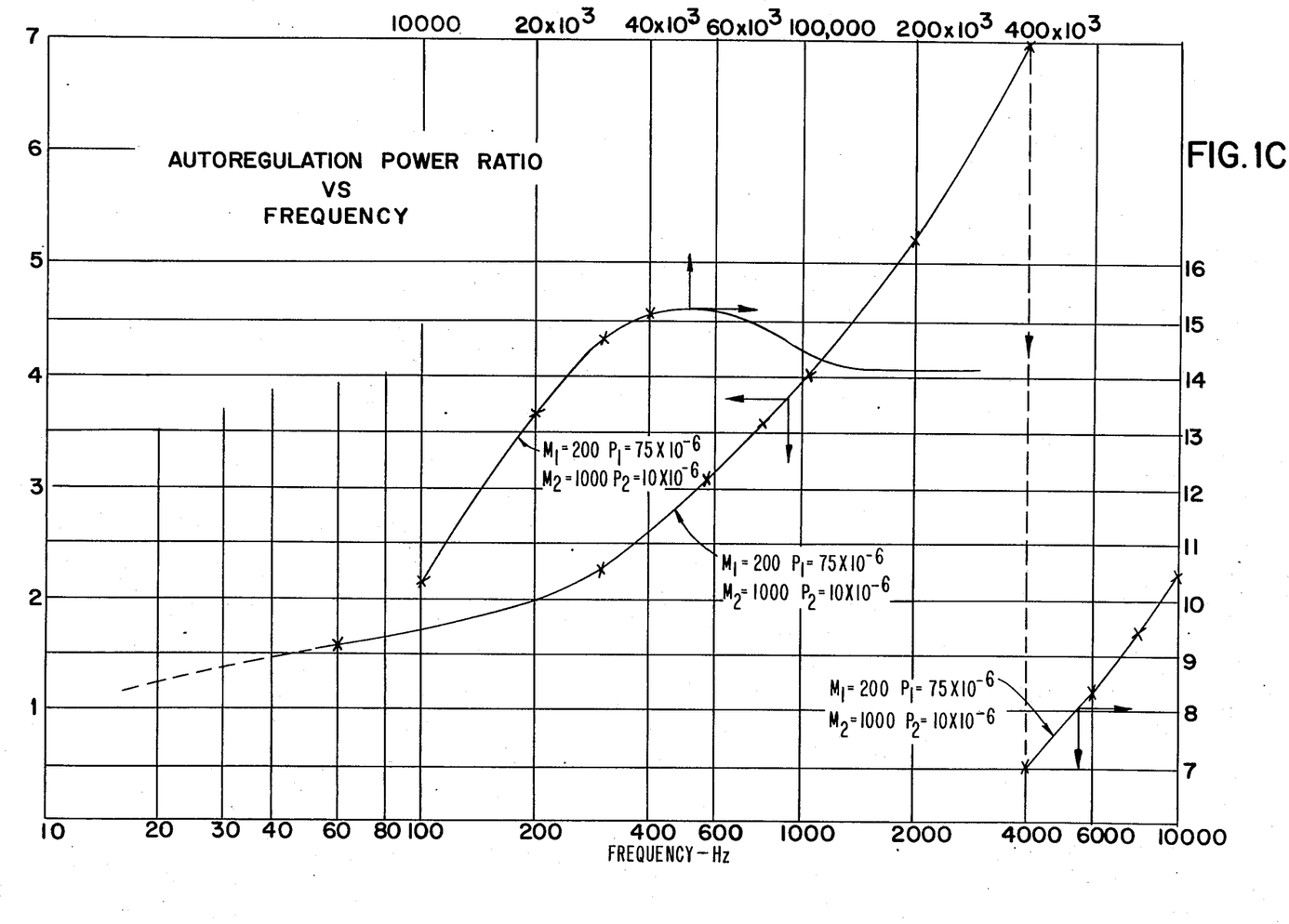
Figure 1D:
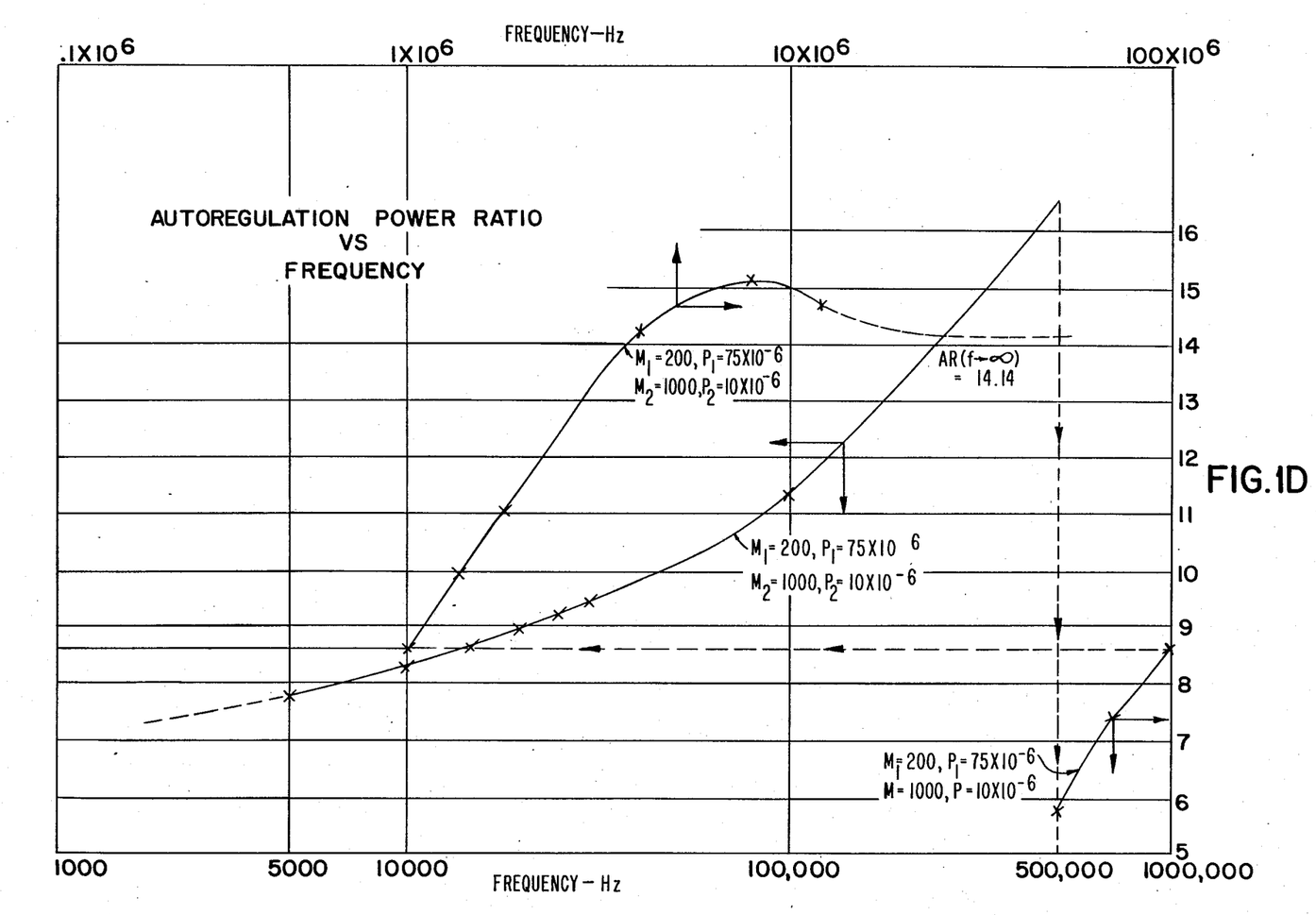
Figure 2:
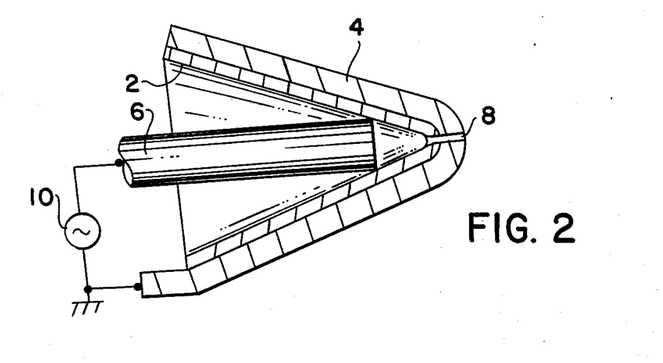
FIG. 2 is a view in cross section of a soldering iron fabricated in accordance with the present invention.

Referring now specifically to FIG. 2 of the accompanying drawings, there is illustrated in cross section, a soldering iron tip fabricated in accordance with the present invention. The drawing illustrates an inner cone 2 of high permeability, high resistivity, low Curie temperature material, some examples of which, with their compositions, permeabilities, resistivities, and Curie temperatures are listed in Table 1 below:

TABLE 1

| MATERIAL | CURIE POINT | ρ | EFFECTIVE PERMEABILITY |
|---|---|---|---|
| 30% Ni Bal Fe | 100° C. | $80 \times 10^{-6}$ | 100–300 |

TABLE 1-continued

| MATERIAL | CURIE POINT | ρ | EFFECTIVE PERMEABILITY |
|---|---|---|---|
| 36% Ni Bal Fe | 279° C. | 82 × 10⁻⁶ | ↓ |
| 42% Ni Bal Fe | 325° C. | 71 × 10⁻⁶ | 200–400 |
| 46% Ni Bal Fe | 460° C. | 46 × 10⁻⁶ | ↓ |
| 52% Ni Bal Fe | 565° C. | 43 × 10⁻⁶ | ↓ |
| 80% Ni Bal Fe | 460° C. | 58 × 10⁻⁶ | 400–1000 |
| Kovar | 435° C. | 49 × 10⁻⁶ | ↓ |

An outer cone 4 is formed coaxial with, about, and in electrical contact preferably through its entire inner surface with the cone 2. The cone 4 is fabricated from a high permeability, preferably low resistivity and high Curie temperature material, examples of which are set forth in Table 2 below:

TABLE 2

| MATERIAL | CURIE POINT | ρ | EFFECTIVE PERMEABILITY |
|---|---|---|---|
| Low Carbon Steel | 760° C. | 10 × 10⁻⁶ | >1,000 |
| Cobalt | 1120° C. | 9.8 × 10⁻⁶ | >1,000 |
| Nickel | 353° C. | 6.8 × 10⁻⁶ | >500 |

A low resistance, cylindrical rod or tube 6, copper, for instance, extends along the axis of the cones 2 and 4 and is insulated therefrom except at the apex of the cones where it is in direct electrical contact with both cones 2 and 4. In one form of the invention, the apices of the cones 2 and 4 are drilled to a size to snuggly receive a small diameter extension 8 of the rod 6 which extension is suitably electrically and mechanically secured (as by swaging or welding) in the passage through the apices of the cones 2 and 4. The extension 8 may terminate flush with the narrow end of the outer cone 4.

To complete the Figure, a constant current, a.c. supply 10 is connected between the center conductor and the large diameter ends of the cones 2 and 4.

Upon excitation of the supply 10, alternating current flowing in the circuit is confined to the surface of the cone 2 adjacent the return path, i.e. the rod 6. The power dissipated is determined by the equation $P = I^2 R_1$ where $I^2$ is a constant "K" due to the use of the constant current supply 10 and $R_1$ is the resistance of the cone 2 at the frequency of the source. The resistance of the cone 2 is a function of the resistivity of the material and also the cross section of the cone 2 to which the current is confined by skin effect. Specifically, resistance is an inverse function of cross-sectional area so that as the cross section of the cone to which the current is confined decreases, as a result of increase in skin effect, the higher the resistance of the cone 2.

As previously indicated, the formula for skin depth in a monolithic material is $$S.D. = 5030 \sqrt{\frac{\rho}{\mu f}} \text{ cm}$$

in CGS units, where $\rho$ is resistivity, $\mu$ is magnetic permeability and $f$ is the frequency of the source. It is quite apparent the skin depth decreases with increase in frequency and thus the effective resistance increases with frequency.

In the present invention, power supplies of relatively low frequencies, i.e. 60 Hz to 10 KHz may be employed. In such a case, the effective cross-sectional area of the current path is considerably greater than in the prior art device in which frequencies of 8–20 MHz are employed. For instance, skin depth at 60 Hz of Alloy 42 is 0.1" at a permeability of 400, but is 0.0003" at 8 MHz. Thus, at 60 Hz, the thickness of the Alloy 42 layer is larger and resistance of the optimum laminar structure is less than at 8 MHz. High resistivity materials are preferably employed for the cone 2 in accordance with the present invention in order to provide the high resistance below Curie temperature necessary to produce the marked change in resistance at the Curie temperature required to produce the desired change in heating in accordance with the formula P=KR. Specifically, in order to autoregulate temperature, the resistance of the circuit must decrease materially when the Curie temperature of the material of cone 2 is approached. A power ratio of say, 6 to 1, provides excellent regulation for most purposes and for a soldering iron, ratios of 3 to 1 are perfectly acceptable for substantially all uses. As pointed out in the aforesaid U.S. Pat. No. 4,256,945, in a solid, i.e., monolithic material, the ratio of resistance values at a given frequency is a function of permeability and resistivity.

Thus, $$\frac{R \max}{R \min} = \sqrt{\frac{\mu m \max \rho \max}{\mu m \min \rho \min}} \quad (1)$$

Since $\rho$ does not change appreciably with temperature and $\mu$ falls to 1 at the Curie temperature, a permeability of 400 would lead to a resistance change in solid alloy 42 of $$\sqrt{400} = 20.$$

The current in a composite, i.e., laminar structure is no longer confined to this layer; in fact, a large majority of the current flows in the cone 4 at the Curie temperature. Thus, the resistivity of the material of the cone 4 becomes important and as indicated previously, the resistivity of the low carbon steel of the example is $10 \times 10^{-6}$ ohm-cms.

In operation, when current is initially applied to the apparatus, the current is confined to the cone 2 which is, in the example discussed herein, 0.1" thick; this being one skin depth of Alloy 42 at 60 Hz. The device heats until the Curie temperature of the material, about 325° C. in the example, is approached at which point the permeability decreases and the current begins to spread into the cone 4. The temperature of the material of the cone 4 is still well below its Curie temperature and most of the current is confined to the cone 2 and to a few skin depths of the cone 4 at 60 Hz, i.e., approximately 0.025". With the current penetrating into a layer with a resistivity of $10 \times 10^{-6}$ ohm-cms, a material drop in resistance of the circuit is realized.

Figure 3:
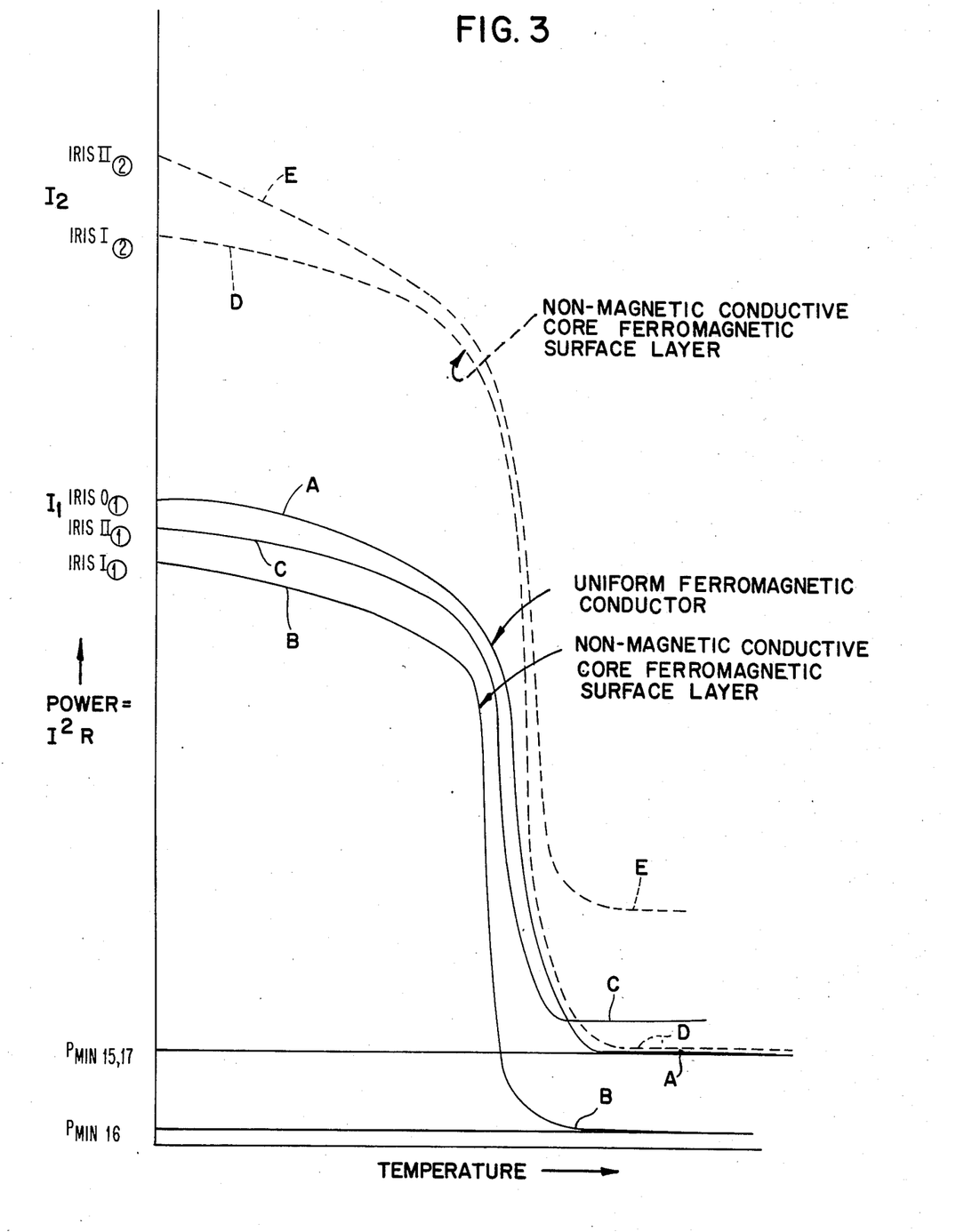
FIG. 3 is a series of graphs illustrating the power versus temperature characteristics of the apparatus of the present invention in comparison with those of the aforesaid patent.

The curve of FIG. 3 is referred to; this figure being a power vs. temperature curve that is of the type illustrated in FIG. 3 of the aforesaid U.S. Pat. No. 4,256,945. Graph A of FIG. 3 is a plot of Power dissipated ($I^2R$) vs. Temperature for a uniform, i.e., non-laminar, magnetic conductor. Equation 1 is applicable, the changes in resistivity being virtually none, and the change in permeability being on the order of 300 to 1.

Graph B is a plot for the device of the aforesaid patent. In this arrangement, the power dissipation below Curie temperature is less than in the non-laminar device of Curve A due to the fact that some of the current flows in the copper which has a markedly low resistance than the magnetic layer. Above the Curie temperature, Curve B dips to a very low value due to flow of a majority of the current in the copper. The overall change in power dissipated in the device of Curve B is thus greater than in the case of the solid magnetic structure.

Reference is now made to Curve C which is for the device of the present invention. It is seen that below the Curie temperature, the power dissipated by the present device is less than for Curve A, but more than Curve B since the resistance ratios dominate. There is little resistance change for Curve A, but a large change for Curve B. Above the Curie temperature, the permeability ratios dominate and since one layer of the present device remains magnetic, permeability and resistivity do not change as much as in the other two devices and more power is dissipated. Thus, the power dissipation ratio for the present device is not as great as for the monolithic device or for the others. However, the present invention has an advantage of size and cost over the solid conductor device and an advantage of cost over the patented device.

The relative performance of the patented device and that of the present invention is also seen in Curves D and E, respectively, which are plotted for a higher constant current.

Figure 4:
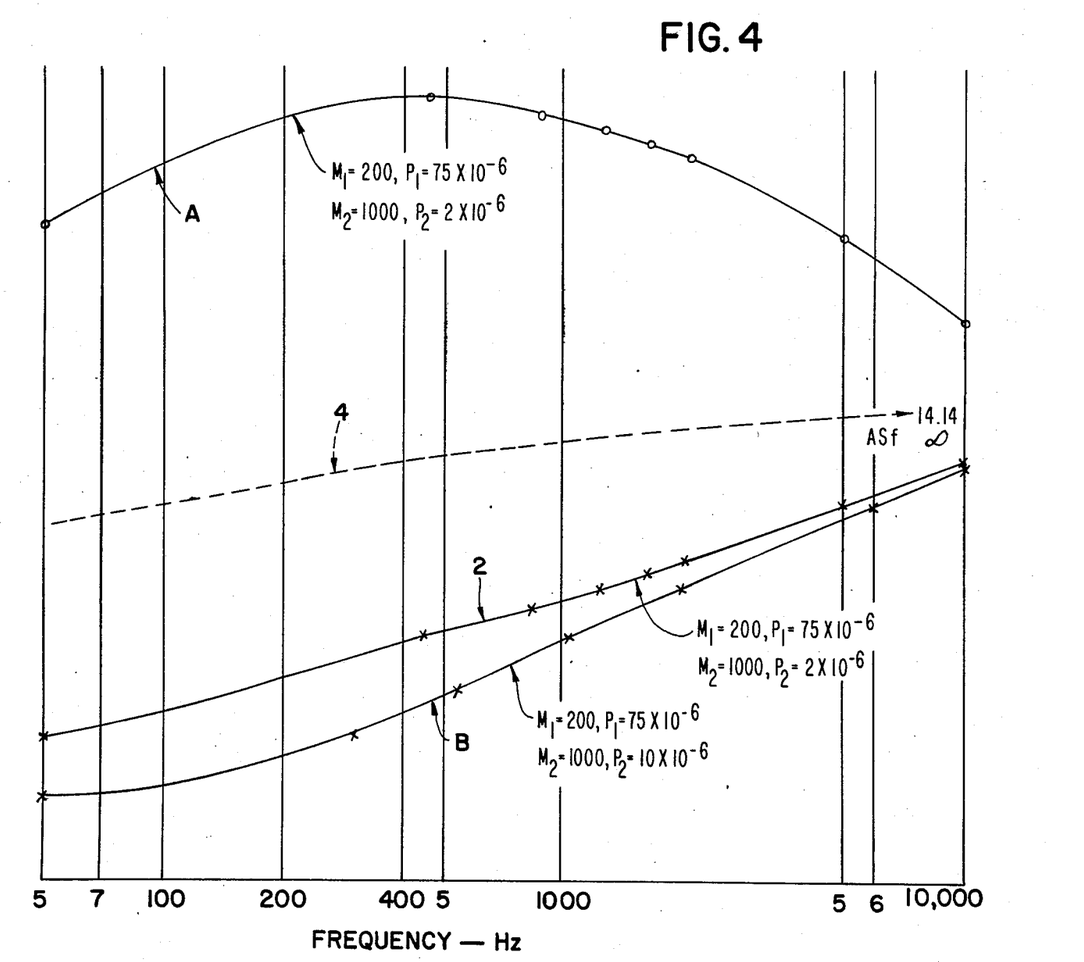
FIG. 4 is a series of graphs illustrating the autoregulating power ratio versus frequency characteristics of the apparatus.

Referring to FIG. 4 of the accompanying drawings, Curves A and B are plots of the autoregulating power ratios for the apparatus of the present invention applied against the scales as indicated on the curves. It will be noted again that the autoregulating ratio of the device of the prior patent as depicted by Curve B of FIG. 1 rises to 160 at 6 MHz with a first layer thickness of $0.5 \times 10^{-3}$ inch and copper as the second layer. As depicted by Curves B of FIG. 4, with a first layer thickness of 0.10 inch, a ratio of 1.6 is attained at 60 Hz and a ratio of 4 at 1000 Hz. A ratio of 4 is attained, as shown in FIG. 4, Curves B, with a different first layer thickness of 0.010 at 180 KHz. These ratios are attained with layers of Alloy 42 and carbon steel as previously indicated. For purposes of soldering irons and devices for uses not requiring precise regulation, the ratio of 3:1 to 4:1 is quite ample.

In order to provide adequate protection against electromagnetic radiation and electrical short circuit or drain, in those instances where such protection is required, the thickness of the cone 4 must be at least several times the skin depth. At a frequency of 60 Hz, the cone 2 may be 0.10" and the cone 4 may be 4×0.025; the factor 0.025 being approximately skin depth multiplied by 4 to prevent consequential electromagnetic radiation and current leakage to the surface of cone 4. In an annular device, all transverse dimensions are multiplied by two, so thicknesses apart from the 0.25" diameter center rod are 2(0.10+4×0.025)=0.40". With the center rod added, thickness is (0.400+0.25)=0.65. As previously indicated, at 8500 Hz, the diameter of the device would be 0.24" and increasingly less at higher frequencies.

It should be noted that the calculations set forth in the examples above, are based on the use of Alloy 42 with a permeability of about 400 and resistivity of about $70 \times 10^{-6}$ ohm-cms and carbon steel with a permeability of about 1000 and resistivity of about $10 \times 10^{-6}$ ohm-cms. The use of these materials has been chosen for the example since they are readily available. Other combinations of materials of Tables I and II may be employed.

The use of the devices of the present invention permits the use of low frequency source without radiation of harmful electromagnetic energy even in units with small dimensions. The result is achieved by employing high permeability materials for both the low and high resistivity layers. It should be noted that the permeabilities and/or the resistivities of the two layers may be the same; the major requirement being that the outer laminate material has a higher Curie temperature than the inner laminate material.

Although the invention is disclosed as employed in a soldering iron, it is obviously useful in many fields where low cost, well-regulated heating is desired, such as scalpels, devices for aircraft, etc. The device may be cylindrical such as in FIG. 1 of the aforesaid patent in which case the position of the lamina is reversed, i.e., the lower Curie point material surrounds the higher Curie point material. Also, the device may be flat as in a scalpel or an elongated heating element for heating pipes.

The term "constant current" as employed herein does not mean a current that cannot increase but means a current that obeys the following formula;

$$\frac{\Delta I}{I} < -\frac{1}{2}\frac{\Delta R}{R}. \quad (2)$$

Specifically, in order to autoregulate, the power delivered to the load when the heater exceeds Curie temperature, must be less than the power delivered to the load below Curie temperature. If the current is held invariable, then the best autoregulating ratio is achieved short of controlling the power supply to reduce current. So long, however, that the current is reduced sufficiently to reduce heating, autoregulation is achieved. Thus, when large autoregulating ratios are not required, constraints on the degree of current control may be relaxed thus reducing the cost of the power supply.

The above equation is derived by analyzing the equation:

$P = (I + \Delta I)^2 (R + \Delta R)$ where P is power, differentiating P with respect to R)

$$\frac{dP}{dR} = I^2 + 2RI\left(\frac{dI}{dR}\right)$$

and to satisfy the requirements for autoregulation $dP/dR < 0$. Thus, $I^2 + 2RI \, (dI/dR) < 0$ which reduces to Equation 2 above.

The present invention is not intended to be limited to use with laminated structures only. Two non-laminated members in electrical contact will function in the present invention; the uniformity and extent of electrical contact determining the actual performance of such a device.

The frequency of the supply utilized herein is not restricted to a specific range of frequencies. Properly proportioned devices are useful throughout the frequency range 50 Hz to 15 MHz. The majority of uses, however, do not require power supply frequencies above 1000 to 5000 Hz.

In the apparatus as illustrated in FIG. 2, the magnetic circuit is completely closed on itself and such is the preferred structure since no demagnetizing effects are realized due to flux leakage. Non-continuous paths can be used if the thickness of the magnetic layer is quite small relative to the surface area of the layer whereby the leakage flux constitutes an insignificant part of the total flux.

Once given the above disclosure, many other features, modifications and improvements will become apparent to the skilled artisan. Such other modifications, features and improvements are, therefore, considered a part of this invention, the scope of which is to be determined by the following claims.

I claim:

1. An element for an autoregulating heating device comprising:
    a laminated structure having at least a first lamina and a second lamina, both being a material having a high magnetic permeability,
    said first lamina being of a material having a lower Curie Temperature than said second lamina,
    said laminae being in electrical contact along their adjacent surfaces.

2. The element according to claim 1 wherein the resistivity of said first lamina is in the range of two to ten times the resistivity of said second lamina.

3. The element according to claim 1 or claim 2 wherein one of said laminae surrounds the other of said laminae.

4. An autoregulating heating device including the element of claim 1 or claim 2 and comprising:
    a constant current alternating current source,
    said element adapted to be connected across said source such that the current paths through said laminae are in parallel and parallel to the interface between said laminae.

5. The element according to claim 4 wherein said source operates at a frequency of at least 50 Hz.

6. A soldering iron having a heating element including the element of claim 1 wherein:
    said first lamina is a hollow cylindrical member,
    said second lamina is a hollow cylindrical member coaxial with and having an inner surface surrounding said first lamina and in electrical contact therewith, and
    a conductive member extending coaxial of and within said first lamina,
    one end of said conductive rod being in electrical contact with said laminae at one and the same end of said cylinders.

7. The device according to claim 6 further comprising:
    a constant current source connected across said rod and said element remote from said one end of said rod.

8. A structure comprising:
    a first member of a material having a high magnetic permeability,
    a second member of a material having a high magnetic permeability,
    said first member having a lower Curie point than said second member,
    said members contacting one another over a coextensive length of each, and
    said members adapted to have an alternating, constant current source connected across a coextensive length of said member to induce parallel flow currents therein.

9. An autoregulating heating device including the structure of claim 8 and further including
    an alternating current, constant current source of a frequency in a range of approximately 50 Hz and higher,
    means connecting said source across said lengths of said members.

10. The method of autoregulating the temperature of a heater of small size at low frequencies comprising the steps of
    providing a laminated structure having at least first and second layers of high magnetic permeability material electrically contacting one another and having different Curie temperatures, and
    applying a constant current alternating current across the laminated structure to cause current to flow in parallel in the laminae.

11. The element according to claim 1 or claim 6 wherein said second lamina has a thickness equal to at least three skin depths in said second lamina at operating frequency of said element.

12. The element according to claim 4 wherein said second lamina has a thickness equal to at least three skin depths in said second lamina at the operating frequency of said element.

13. The element according to claim 1 or claim 2 further comprising
    A current return path adjacent said first lamina and remote from said second lamina.

14. A heating element comprising
    a first conductor having a large area surface,
    a second conductor having a large area surface,
    said surfaces having extensive areas in electrical contact with one another,
    both said conductors having high magnetic permeabilities with one of said conductors having a higher Curie temperature than the other of said conductors.

15. A heater incorporating the heating element of claim 14 and further comprising
    a current return path extending generally parallel to said conductor and located adjacent to the other of said conductors and remote from said one of said conductors,
    said current return path insulated from said conductors and adapted to be connected in series with said conductors across a source of current.

16. The heater according to claim 15 wherein said first and second conductors are generally coextensive and in physical contact with one another and
    wherein said current return path is connected to a common end of said conductors.

* * * * *